US012780024B1

(12) United States Patent
MacGregor

(10) Patent No.: US 12,780,024 B1
(45) Date of Patent: Nov. 3, 2026

(54) ELECTRIC VEHICLE SUPPLY EQUIPMENT (EVSE) PEDESTAL BACKGROUND

(71) Applicant: Amazon Technologies, Inc., Seattle, WA (US)

(72) Inventor: Mike MacGregor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 852 days.

(21) Appl. No.: 18/063,286

(22) Filed: Dec. 8, 2022

(51) Int. Cl.
*H02J 7/00* (2026.01)
*B60L 53/18* (2019.01)
*B60L 53/31* (2019.01)
*H02J 7/14* (2006.01)
*H02J 7/70* (2026.01)

(52) U.S. Cl.
CPC ............... *B60L 53/31* (2019.02); *B60L 53/18* (2019.02); *H02J 7/70* (2026.01)

(58) Field of Classification Search
CPC ................................. B60L 53/18; B60L 53/31
USPC ........................................................... 320/132
See application file for complete search history.

(56) References Cited

U.S. PATENT DOCUMENTS 6,803,744 B1 * 10/2004 Sabo ....................... H02J 50/10 320/108
7,779,588 B1 * 8/2010 Bruning .................. E02D 27/02 52/297
2011/0145141 A1 * 6/2011 Blain ...................... B60L 53/65 235/382
2012/0153716 A1 * 6/2012 Lee ......................... B60L 50/20 307/9.1
2013/0020990 A1 * 1/2013 DeBoer ................. B60L 53/305 320/109
2014/0239887 A1 * 8/2014 Hamada .................... H02J 7/70 320/107
2016/0121747 A1 * 5/2016 Jefferies .................. B60L 53/16 320/109
2018/0342844 A1 * 11/2018 Broere .................... B60L 53/16
2019/0098998 A1 * 4/2019 Harguth ................... A47C 3/04
2019/0245365 A1 * 8/2019 Farrahi Moghaddam .................. H02J 7/70
2019/0263281 A1 * 8/2019 Wang ...................... B60L 53/16
2019/0393709 A1 * 12/2019 Haase ........................ H02J 7/70
2020/0227903 A1 * 7/2020 Helnerus ................... H02J 7/70
2020/0280201 A1 * 9/2020 Helnerus ................. B60L 53/31
2021/0053456 A1 * 2/2021 Freeling-Wilkinson ..................... B60L 53/14
2021/0178921 A1 * 6/2021 French .................... B60L 53/67
2021/0252989 A1 * 8/2021 Price ....................... B60L 53/31
(Continued)

*Primary Examiner* — Alexis B Pacheco
(74) *Attorney, Agent, or Firm* — Eversheds Sutherland (US) LLP

(57) ABSTRACT

An electric vehicle supply equipment (EVSE) pedestal is provided. The EVSE includes a top shroud to which an EVSE may be mounted. The shroud may also be configured to be universal and receive any number of different types of EVSEs. The EVSE pedestal includes one or more side panels that are provided at an angle with respect to a top surface of the EVSE pedestal. This results in the EVSE pedestal comprising a “trestle” or “pyramid” shape, which provides for increased structural rigidity and provides the EVSE pedestal the ability to withstand environmental conditions, such as high-velocity wind. One or more of the side panels may also be removable to, among other reasons, allow for a user to access the interior of the EVSE pedestal, which may contain some of the electrical connections associated with the EVSE.

21 Claims, 9 Drawing Sheets

(56) References Cited

U.S. PATENT DOCUMENTS

| | | | | |
|---|---|---|---|---|
| 2022/0393416 | A1* | 12/2022 | Schneider | H01R 31/065 |
| 2023/0087251 | A1* | 3/2023 | Zhang | G01S 19/071 320/108 |
| 2023/0348106 | A1* | 11/2023 | Berthelet | B64U 70/97 |
| 2024/0049407 | A1* | 2/2024 | Seff | H02G 3/0493 |
| 2024/0075834 | A1* | 3/2024 | Michael | B60L 53/31 |
| 2024/0198827 | A1* | 6/2024 | Vicari | B60L 53/30 |
| 2024/0424933 | A1* | 12/2024 | Cristache | B60L 53/53 |
| 2025/0038509 | A1* | 1/2025 | Parsons | H02G 9/10 |

* cited by examiner

ELECTRIC VEHICLE SUPPLY EQUIPMENT (EVSE) PEDESTAL BACKGROUND

BACKGROUND

An electric vehicle supply equipment (EVSE) is a device used to supply electric energy to recharge one or more batteries of an electric vehicle (EV). For example, an EVSE may include electrical conductors, related equipment, software, and communication protocols that deliver energy efficiently to the EV. The EVSE may be installed in any number of different types of environments, such as a parking lot, a garage of a residential home, etc. Industry standards may require that the EVSE is provided at a particular height (for example, 1.2-1.4 meters), at which users are able to interact with the EVSE (for example, read a display, access the charging cable, etc.).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, an electric vehicle supply equipment (EVSE) pedestal. The EVSE pedestal is a structure that allows for an EVSE to be provided at a given height at which users are able to interact with the EVSE (for example, read a display, access the charging cable, etc.). Further, the EVSE pedestal is also specifically configured to withstand certain environmental conditions, such as wind gusts. This is advantageous because the EVSEs may oftentimes be provided outside within an open environment, such as a parking lot, and thus subject to these environmental conditions. The EVSE pedestal is also configured to provide this structural rigidity in a more economical form factor. Finally, the EVSE pedestal is configured to be standardized for different types of EVSEs. Consequentially, if it is desired to replace an existing EVSE with a different type of EVSE, the EVSE pedestal may remain in place and the prior EVSE may simply be replaced with the new EVSE. These are merely a few advantages of the EVSE pedestal described herein, and further advantages may be described below.

In one or more embodiments, the EVSE pedestal may be a structurally-optimized metal trestle component that is capable of being manufactured in thin gauge metal through high-volume sheet metal manufacturing processes, thereby delivering maximum structure at minimum cost. A standard mount interface provided at the top of the trestle (referred to herein as the "top surface") allows for the use of a shroud (illustrated further in FIGS. 1B and 6) capable of mounting to specific, non-standardized level two alternating current (AC) EVSE models (and/or any other types of EVSEs). That is, the shroud may be standardized to include different hole patterns that align with mounting holes existing on different types of EVSEs. Cover plates (referred to herein as "side panels") may provide a fully-enclosed duct for AC electrical supply input to the EVSE from the sources below or on the surface to which the EVSE pedestal is mounted (for example, a parking lot, garage floor, etc.). In some embodiments, the cover plates may be trapezoid-shaped. The cover plates may also provide structural bolstering of the trestle and may be attached with conventional fasteners (for example, thread-forming screws). The above description of the EVSE pedestal is merely exemplary and not intended to be limiting. Additional details about the EVSE pedestal are provided below with respect to the figures.

Figure 1A:
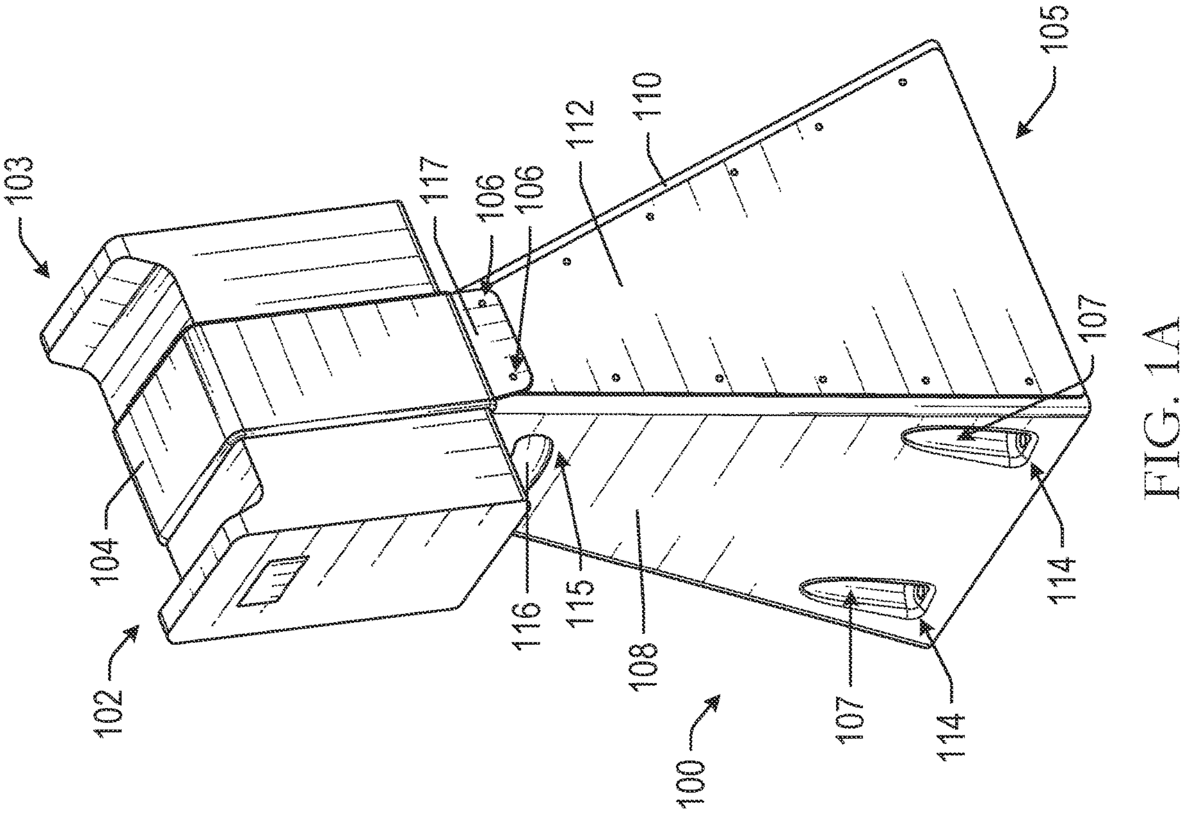
FIG. 1A is an illustration of a perspective view of an EVSE pedestal with a mounted EVSE in accordance with one or more example embodiments of the disclosure.

Turning to the figures, FIG. 1A is an illustration of a perspective view of an EVSE pedestal 100 with a mounted EVSE 102 in accordance with one or more example embodiments of the disclosure. It should be noted that FIG. 1A also depicts a second EVSE 103, however, for simplicity reference may be made herein to the single EVSE 102. Any reference hereinafter to a single EVSE (such as EVSE 102) may similarly apply to any other number of EVSEs that are supported by the EVSE pedestal 100.

The EVSE pedestal 100 may be configured in a "trestle" or "pyramid" shape. That is, the EVSE pedestal 100 may include a top surface (for example, top surface 120 shown in FIG. 1B) with one or more side panels extending downwards at an angle from the top surface 120. For example, FIG. 1A shows a first side panel 108 and a second side panel 110. However, the EVSE pedestal 100 may also be configured to include any other number of side panels as well. Providing the one or more side panels at an angle results in the area of a base 105 of the EVSE pedestal 100 being larger than the area of the top surface 120 of the EVSE pedestal 100.

Providing the EVSE pedestal 100 in this "trestle" configuration provides additional structural rigidity to the EVSE pedestal 100 and reduces the likelihood that the EVSE pedestal 100 and/or the EVSE 102 mounted to the EVSE pedestal 100 would be impacted by environmental conditions, such as wind. For example, the EVSE pedestal 100 may be configured to withstand wind speeds of over 113 MPH (or any other wind speed). This is advantageous when the EVSE pedestal 100 is installed in an open environment, such as a parking lot, which may be subject to such wind speeds during storm conditions. This specific configuration of the EVSE pedestal 100 also provides protection for the EVSE 102 from impact events in some scenarios, such as an impact from a vehicle. For example, given that the side panels extend downward at an angle, a vehicle is more likely to impact the side panels of the EVSE pedestal 100 before impacting the EVSE 102 itself.

The EVSE pedestal 100 may also include one or more removable side panels (for example, removable side panel 112 and/or any other number of removable side panels). In the specific configuration shown in the figure, the removable side panel 112 may be provided on the EVSE pedestal 100 rather than an additional permanent side panel to allow for the removable side panel 112 to be removed from the EVSE pedestal 100 to provide access to an interior of the EVSE pedestal 100. The interior of the EVSE pedestal 100 may be an open space in which various electrical connections associated with the EVSE 102 may be contained. When a user desires to access the electrical connections (for example, to provide a power connection to the EVSE 102 when the EVSE 102 is installed at a location, troubleshoot an electrical issue with the EVSE 102, or for any other reason), the removable side panel 112 may be removed from the EVSE pedestal 100. Otherwise, the removable side panel 112 may be affixed to the EVSE pedestal 100. When affixed to the EVSE pedestal 100, the removable side panel 112 may provide additional structural rigidity to the EVSE pedestal 100. The removable side panel 112 may also protect the interior of the EVSE pedestal 100 from external environmental conditions, such as rain.

In addition to the EVSE pedestal 100 having the removable side panel 112 as shown in FIG. 1A, any of the other side panels of the EVSE pedestal 100 may also be configured as removable side panels as well. For example, side panel 108 and side panel 110 may also be configured to be removable as well. Providing the EVSE pedestal 100 with multiple removable panels may provide some advantages. For example, manufacturing costs and resource requirements may be reduced as the EVSE pedestal 100 may not necessarily need to be manufactured with permanent side panel structures. Rather, the EVSE pedestal 100 may simply include four legs that extend downwards at an angle from the top surface 120 with openings existing between the four legs.

The one or more side panels may include any number of different types of materials. For example, the one or more side panels may comprise metals, plastics, etc. In some embodiments, the first side panel 108 and the second side panel 110 may comprise a first type of material and the removable side panel 112 may comprise a second type of material. For example, the first side panel 108 and the second side panel 110 may comprise a metal or metal composite and the removable side panel 112 may comprise a plastic material, such as polyvinyl chloride (PVC). However, this is not intended to be limiting and any of the side panels may comprise any number of different types and/or combinations of materials.

Figure 8:
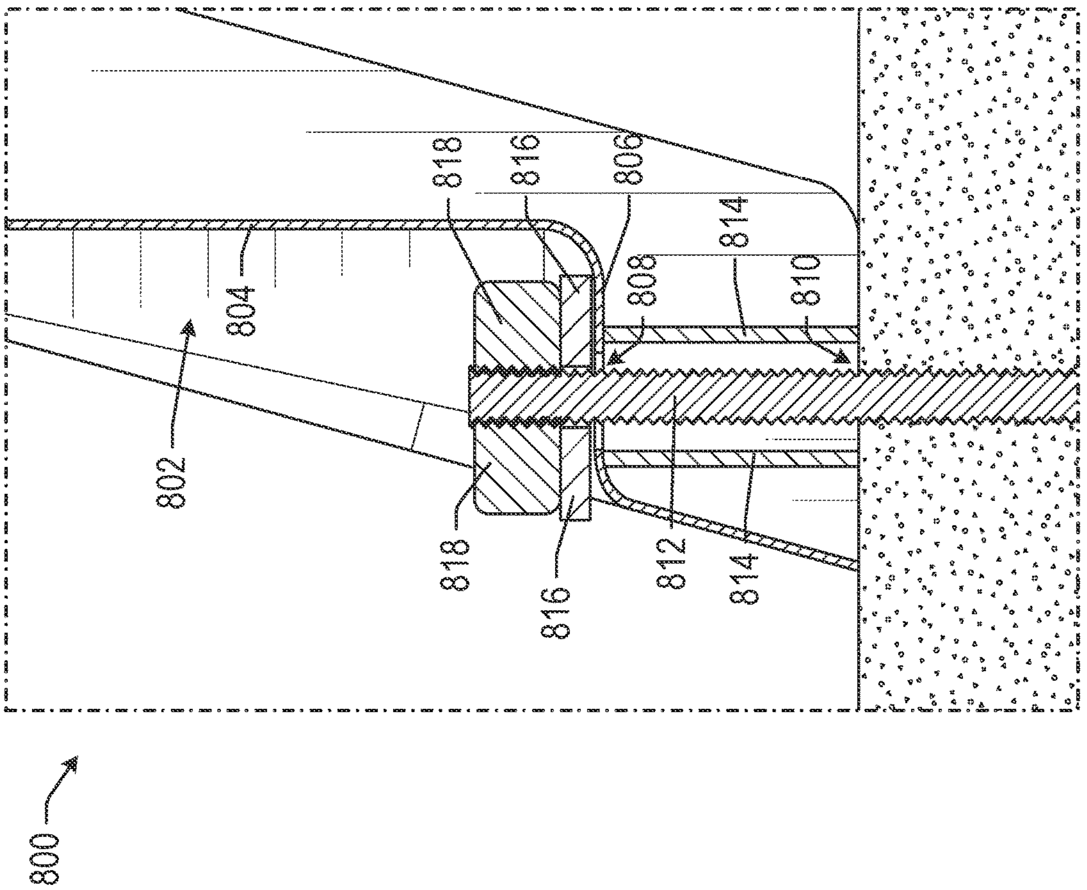
FIG. 8 is an illustration of close-up view of an anchor point on an EVSE pedestal in accordance with one or more example embodiments of the disclosure.

The EVSE pedestal 100 may also include one or more anchor points 114 used to secure the EVSE pedestal 100 to a surface, such as a garage floor, parking lot, etc. For example, an anchor point 114 may include an aperture provided on a bottom surface of a cavity 107 provided in a side panel of the EVSE pedestal 100. A fastener may be provided through the aperture and into the surface on which the EVSE pedestal 100 rests to secure the EVSE pedestal 100 to the surface. For example, a concrete anchor bolt may be provided into the surface. Although only two anchor points are visible in the perspective shown in FIG. 1A, any other number of anchor points may also be provided on any of the side panels of the EVSE pedestal 100. Additionally, less than two anchor points 114 may be provided on any given side panel. Additional details about the one or more anchor points 114 are illustrated in FIG. 8.

The one or more side panels may also include one or more apertures configured to receive one or more electrical connections from the EVSE 102. For example, the figure shows a first electrical connection 116 extending from a bottom portion of the EVSE 102, through the aperture 115, and into the interior of the EVSE pedestal 100. The electrical connection 116 may include any number of different types of connections, such as an alternating current (AC) power connection used to provide power from a power source (not shown in the figure) to the EVSE 102. The electrical connection 116 may also include any other types of connection, such as a data connection to transfer data to and from the EVSE 102, and/or any other type of connection. Although the figure only shows one electrical connection being routed through a side panel and into the interior of the EVSE pedestal 100, any other number of electrical connections may also be routed through any other number of apertures existing on any of the side panels as well. Furthermore, in some cases, some or all of the electrical connections may be routed through an aperture 122 (shown in FIG. 1B) located on the top surface 120 of the EVSE pedestal 100 as well. Thus, in some embodiments, apertures used for routing electrical connections through the EVSE pedestal 100 may not be required on the side panels Although not shown in FIG. 1A, the EVSE 102 may also include a charging cable connected to the EVSE at a distal end of the charging cable and including a charging connector at the proximal end of the charging cable. The charging cable may be stored externally to the EVSE 102 (for example, wrapped around the external surface of the EVSE 102). When a user desires to charge an electric vehicle using the EVSE 102, the charging connector may be inserted into a charging port located on the electric vehicle and the cable may transfer power from the EVSE 102 to the electric vehicle through the charging cable and the charging connector. The EVSE pedestal 100 may also be configured to include a clip or other type of protrusion (not shown in the figure) that may be used to hold the charging cable when not in use.

In one or more embodiments, a shroud 104 may be removably coupled to the EVSE pedestal 100. The shroud 104 may serve as the mounting point for the EVSE 102 with respect to the EVSE pedestal 100. That is, after the shroud 104 is coupled to the EVSE pedestal 100, the EVSE 102 may then be mounted to the shroud 104. In one or more embodiments, the EVSE 102 may be mounted to a side of the shroud 104. For example, the shroud 104 may include one or more fastener holes (shown in FIG. 6) through which one or more fasteners may be provided to secure the EVSE 102 to the shroud 104. The shroud 104 is configured such that the EVSE 102 may be mounted to and removed from the shroud 104 (and thus from the EVSE pedestal 100) at any given time (for example, to install a different EVSE, perform maintenance on an existing EVSE, and/or for any other purposes).

The shroud 104 may be coupled to the EVSE pedestal 100 using any number of different types of suitable mechanisms. For example, FIG. 1A illustrates a shroud 104 that is coupled to the EVSE pedestal 100 by providing one or more fasteners through one or more fastener holes 106 located on the shroud 104. The fasteners may include any number of different types of fasteners, such as screws, bolts, etc. Although only two fastener holes 106 are visible in the perspective view presented in the figure, the shroud 104 may similarly include any number of other fastener holes, including additional fastener holes 106 located on the opposite side of the shroud 104 that is not visible in the perspective presented in the figure.

Figure 1B:
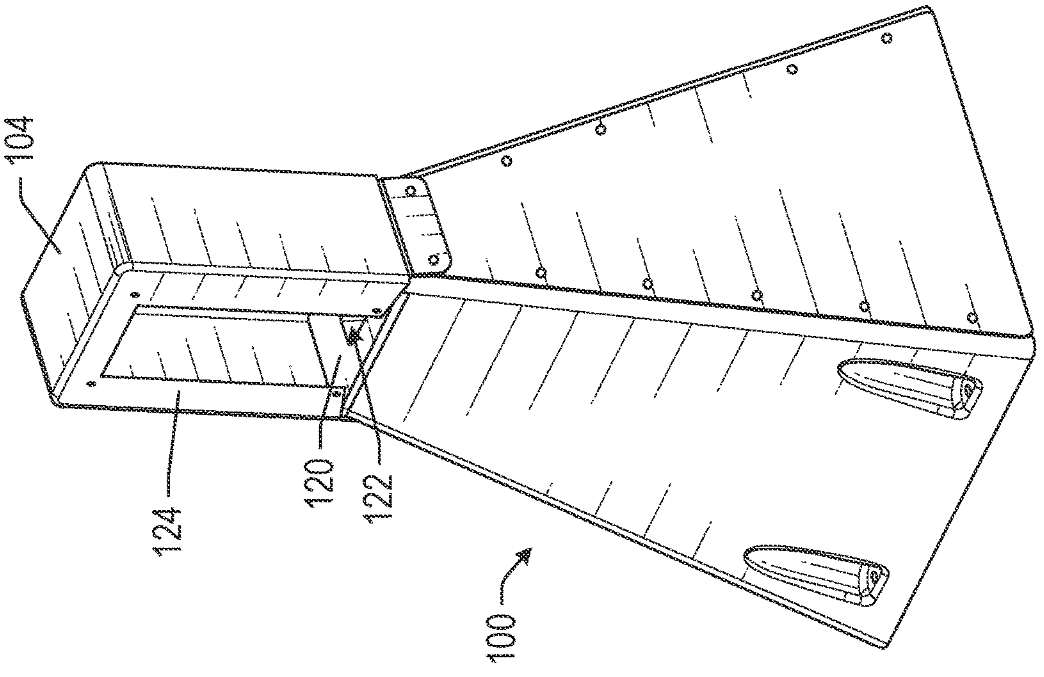
FIG. 1B is an illustration of a perspective view of an EVSE pedestal without a mounted EVSE in accordance with one or more example embodiments of the disclosure.
Figure 6:
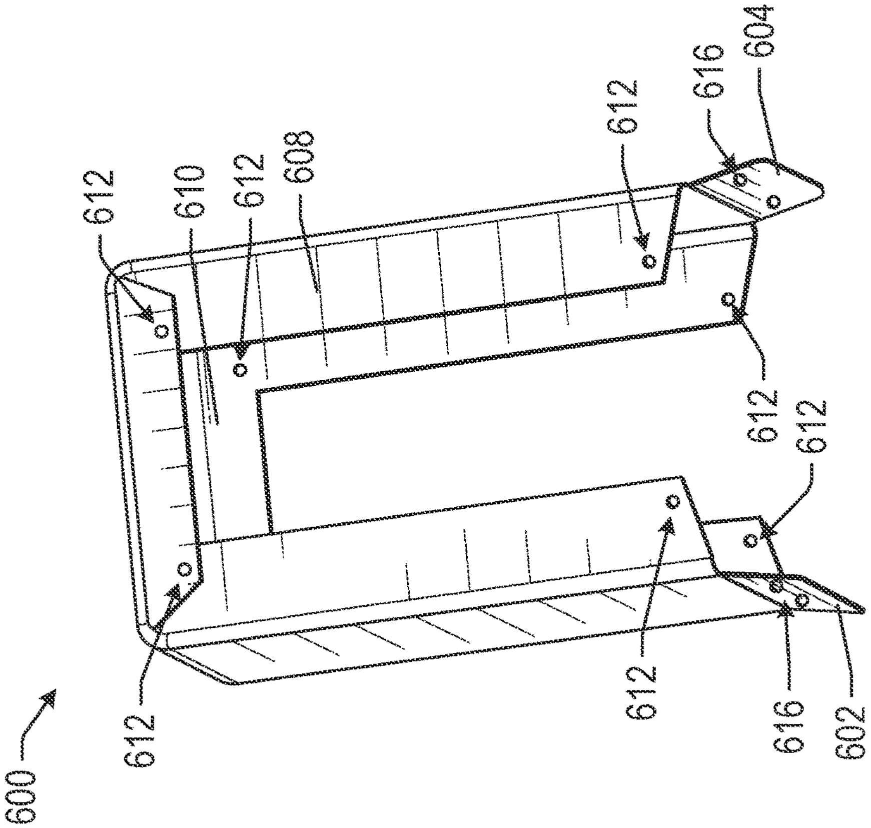
FIG. 6 is an illustration of a shroud for an EVSE pedestal in accordance with one or more example embodiments of the disclosure.

The shroud 104 may also comprise any number of different types of materials, such as metals, plastics, etc. As shown in FIG. 1B and FIG. 6, the shroud 104 may comprise a rigid material that may allow the shroud 104 to serve as an effective mounting point for any number of EVSEs.

In one or more embodiments, the shroud 104 may also be specifically configured to allow a specific type of EVSE 102 to be mounted to the shroud 104. For example, the EVSE 102 shown in the figure may just be one example type of EVSE 102 and any other EVSEs may exist in varying form factors. Given this, if it is desired to mount a different type of EVSE 102 to the EVSE pedestal 100, the shroud 104 may be removed from the EVSE 102 and the EVSE pedestal 100 and a different shroud 104 may be provided instead.

In one or more embodiments, the shroud 104 may also be configured to be standardized for different types of EVSEs. For example, the shroud 104 may be configured with multiple sets of fastener holes that may be compatible with different types of EVSEs. When a first type of EVSE including a first arrangement of fastener holes is mounted to the shroud 104, a first set of fastener holes on the shroud 104 may be used. When a second type of EVSE including a second arrangement of fastener holes is mounted to the shroud 104, a second set of fastener holes on the shroud 104 may be used. This configuration is beneficial because it eliminates the need to have multiple shrouds that are compatible with multiple types of EVSEs.

As shown in FIG. 1A, the mounting member 117 of the shroud 104 may specifically be affixed to an external surface of a side panel. The mounting member 117 may be the portion of the shroud that includes the fastener holes 106. The shroud 104 (specifically, the mounting member 117) may be provided over the side panel rather than underneath the side panel to provide further sealing of the interior of the EVSE pedestal 100 from the external environment. For example, by providing the shroud 106 above the side panel, any water that runs down the EVSE 102 and/or the EVSE pedestal 100 may run down the shroud 104 and the side panel in a similar manner in which rain may run down a shingle on a roof of a building. However, this configuration is not intended to be limiting and the shroud 104 may be affixed to the EVSE pedestal 100 in any other manner as well.

Figure 2:
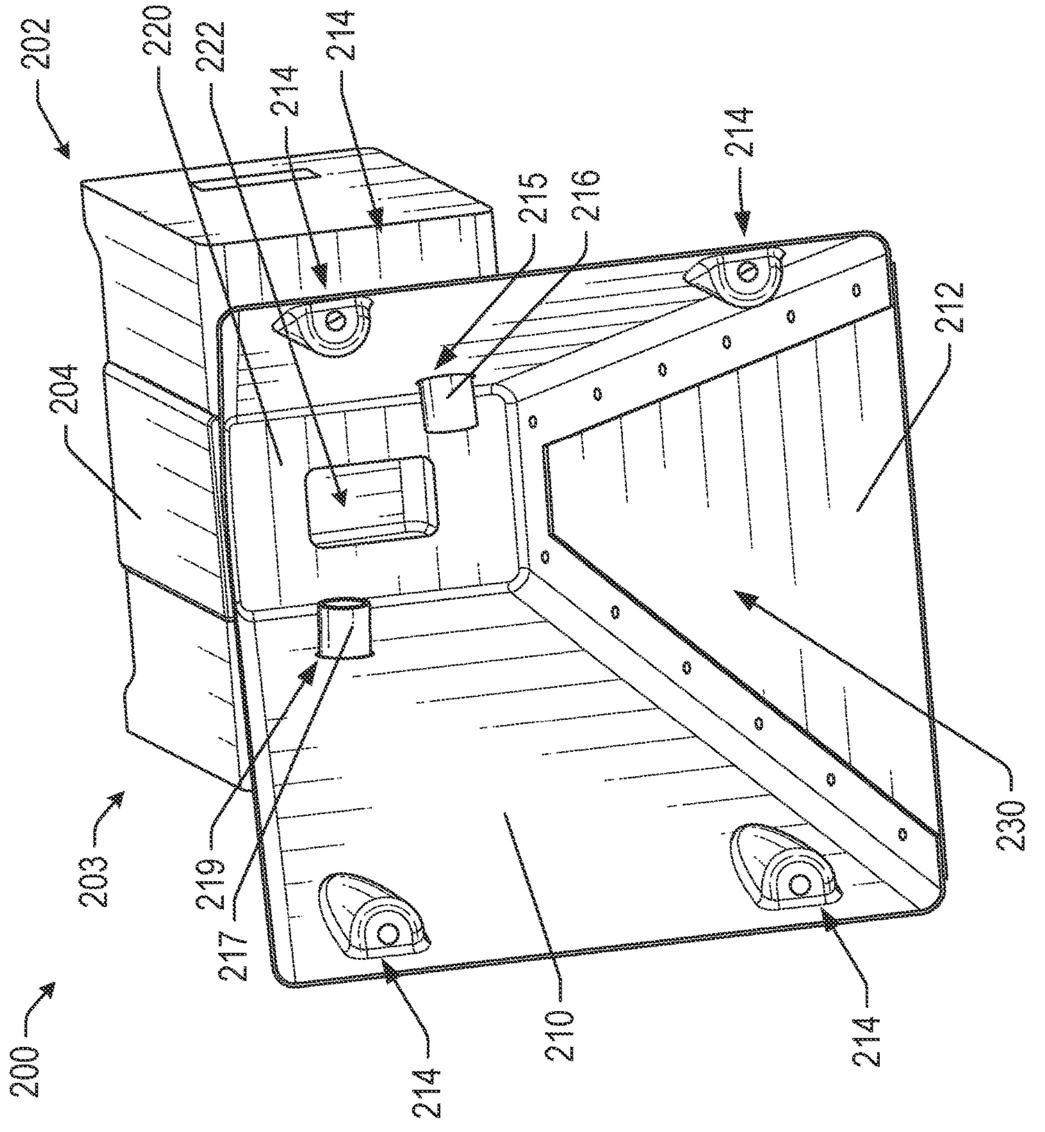
FIG. 2 is an illustration of a bottom-up perspective view of an EVSE pedestal with a mounted EVSE in accordance with one or more example embodiments of the disclosure.
Figure 3:
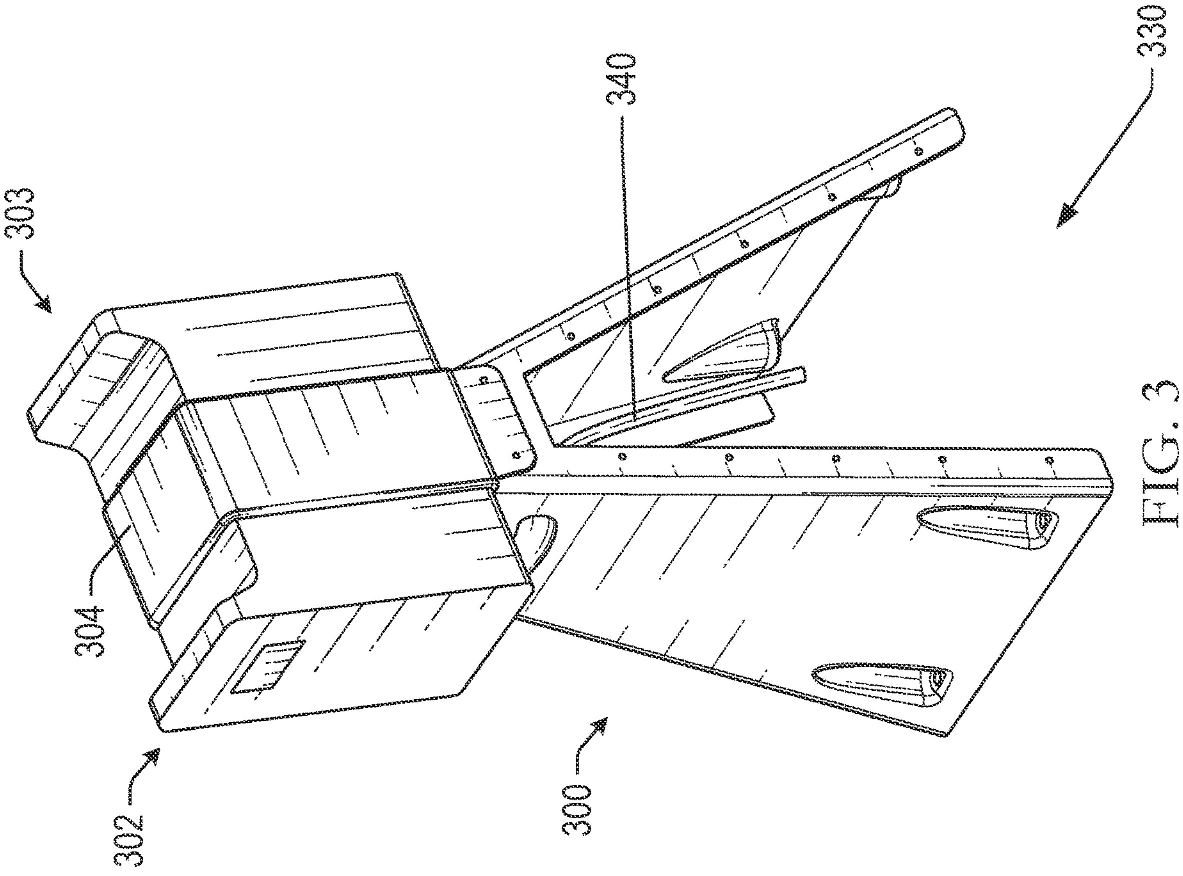
FIG. 3 is an illustration of a perspective view of an EVSE pedestal with electrical connections accordance with one or more example embodiments of the disclosure.

FIG. 1B is an illustration of a perspective view of an EVSE pedestal 100 without a mounted EVSE in accordance with one or more example embodiments of the disclosure. With the EVSE removed, the top surface 120 of the EVSE pedestal 100 is visible. The top surface 120 includes an aperture 122, which is located underneath the shroud 104 when the shroud 104 is mounted to the EVSE pedestal 100. The aperture 122 may be used to route various types of electrical connections from the EVSE through the interior of the EVSE pedestal 100 (FIG. 2 shows a bottom-up perspective view of the interior of the EVSE pedestal 100 and FIG. 3 illustrates an electrical connection included within the interior of the EVSE pedestal 100). Although the aperture is illustrated as a square-shaped aperture, the aperture may similarly be provided in any other shape and/or size as well.

FIG. 1B also further depicts that the shroud 104 may include one or more partial side walls (for example, partial side wall 124). The partial side wall may be the surface of the shroud 104 to which the EVSE is mounted (additional details about how the shroud 104 may be configured to allow the EVSE to be mounted to the shroud 104 are provided in at least FIGS. 6-7). The partial side wall 124 surrounds an opening 126. The opening 126 may be provided on the shroud 104 rather than a complete side wall to, among other reasons, allow for electrical connections on the back surface of the EVSE to be routed through the interior of the shroud 104, through the aperture 122 of the top surface 120 of the EVSE pedestal 100, and into the interior of the EVSE pedestal 100. Using only a partial side wall 124 may also reduce material requirements to create the shroud 104, which may provide for a cheaper manufacturing process as well.

FIG. 2 is an illustration of a bottom-up perspective view of an EVSE pedestal 200 with a mounted EVSE 202 (and EVSE 203) in accordance with one or more example embodiments of the disclosure.

FIG. 2 depicts similar components shown in FIGS. 1A-1B. For example, the figure depicts side panels 210 and 208, as well as removable side panel 212 (which may be the similar to side panels 110 and 108, as well as removable side panel 112). Also depicted is the top surface 220 (which may be similar to top surface 120), which includes an aperture 222 (which may be similar to aperture 222). Also depicted is shroud 204 (which may be similar to shroud 104). The figure also shows anchor points 214 (which may be similar to anchor points 114).

As shown in FIG. 2, the interior 230 of the EVSE pedestal 200 may be hollow to allow electrical connections from the EVSE 202 to be routed through the EVSE pedestal 100. For example, the electrical connection 216 (which may be similar to electrical connection 116) routed through the aperture 215 (which may be similar to aperture 115) and into the interior 230 of the EVSE pedestal 200. FIG. 2 also illustrates that the EVSE pedestal 200 may include multiple apertures for receiving multiple electrical connections. For example, also shown in electrical connection 217 originating from the EVSE 203 that is routed through a second aperture 219 into the interior 230 of the EVSE pedestal 200. It should be noted that the figure only shows a portion of the electrical connections, and the electrical connections may also be any other length. For example, the electrical connections may extend downwards into the interior 230 of the EVSE pedestal 200. In some instances, an electrical connection may be an alternating current (AC) power connection that may be connected to a power source, such as a power grid. Additionally, although not illustrated in FIG. 2, FIG. 3 depicts an electrical connection being routed through the aperture 320 (which may be similar to aperture 220 and/or aperture 120) as well.

The electrical connections may also be stored within the EVSE pedestal 100 for aesthetic and cable management purposes (for example, to prevent some or all of the electrical connections associated with the EVSE 202 from being visible to a user proximate to the EVSE 202). To facilitate routing and/or storage of any electrical connections within the interior 230 of the EVSE pedestal 200, the EVSE pedestal may also include elements for cable management and routing. For example, the side panels (and/or any other portion of the EVSE pedestal 200) may include one or more clips or protrusions that may be used for cable management purposes. The side panels may also include any other structure that may be used to provide cable management as well.

FIG. 3 is an illustration of a perspective view of an EVSE pedestal 300 with electrical connections in accordance with one or more example embodiments of the disclosure. FIG. 3 shows EVSE 302 and EVSE 303 mounted to shroud 304. FIG. 3 also illustrates an opening 330 where a removable side panel (for example, removable side panel 112 shown in FIGS. 1A-1B and/or any other removable side panel) may otherwise be provided. Finally, FIG. 3 provides an illustration of a cable 340 being routed through the interior of the EVSE pedestal 300. In one or more embodiments, any electrical connections may be routed into the interior of the EVSE pedestal 300 through any of the apertures in the side panels of the EVSE pedestal 300 and/or the aperture located on the top surface (not shown in the figure). Although the cable 340 is only shown as being a particular length, the cable 340 may also be any other length as well. Additionally, multiple cables may be routed through the interior of the EVSE pedestal 300 as well.

Figure 4:
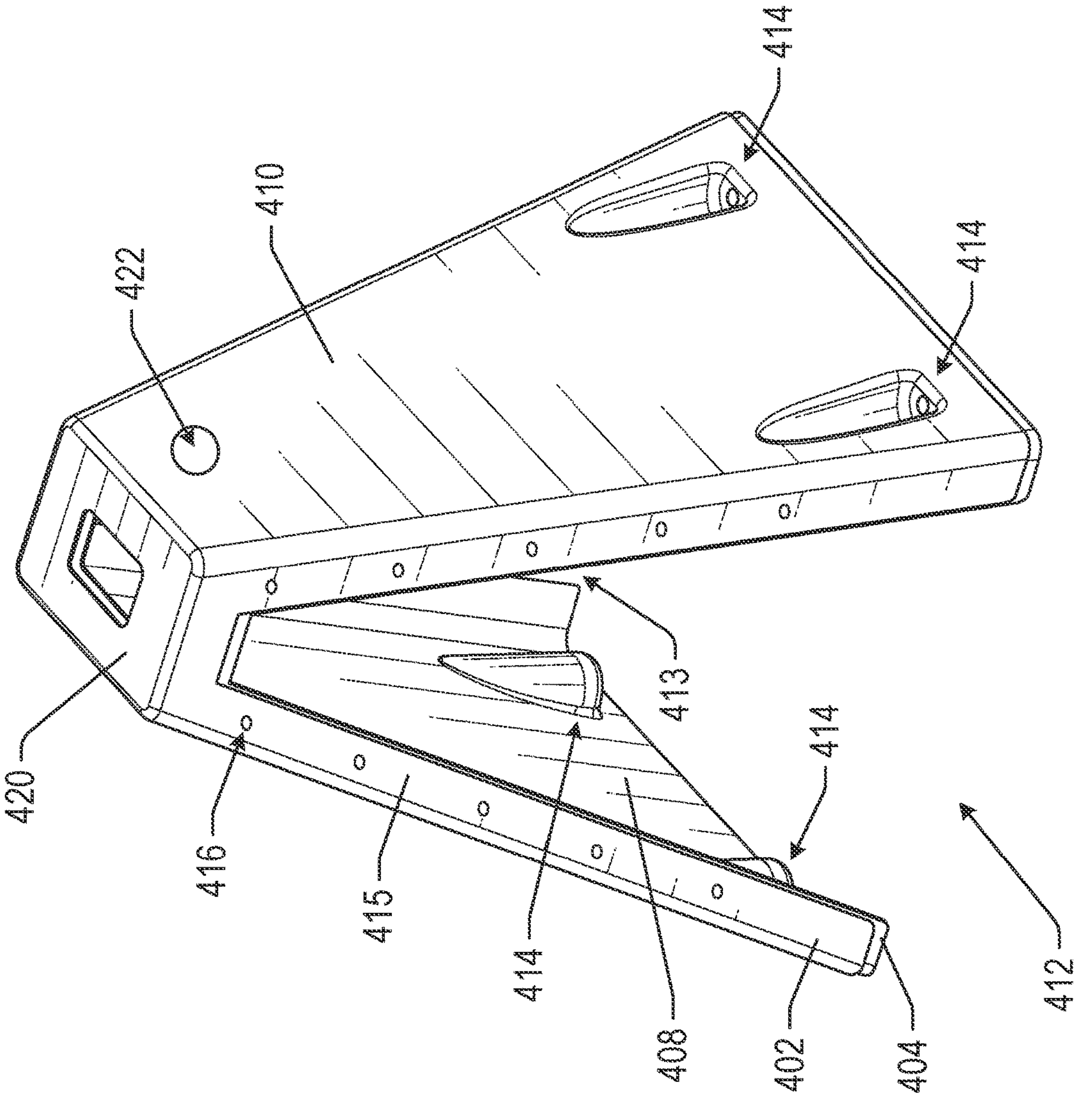
FIG. 4 is an illustration of a perspective view of multiple stacked EVSE pedestals without shrouds in accordance with one or more example embodiments of the disclosure.

FIG. 4 is an illustration of a perspective view of a multiple stacked EVSE pedestals without shrouds in accordance with one or more example embodiments of the disclosure.

Specifically, FIG. 4 shows a first EVSE pedestal 402 stacked on top of a second EVSE pedestal 404. This illustrates another advantage of the EVSE pedestal configuration described herein in that the EVSE pedestals 402 may be stacked as clusters, which may reduce shipping and storage costs and also may reduce the volume of space occupied by the EVSE pedestals 402 if multiple EVSE pedestals 402 are kept at a given location. For example, a parking lot may manage multiple EVSEs associated with multiple EVSE pedestals.

FIG. 4 also provides a depiction of only an EVSE pedestal without a shroud and/or an EVSE mounted to the EVSE pedestal. For example, with respect to the EVSE pedestal 402, the top surface 406, a first side panel 408, and a second side panel 410 are shown. Also shown is an opening 412 corresponding that may be covered by removably attaching a removable side panel (such as removable side panel 112 shown in FIG. 1A). To provide a mounting point for the removable side panel, a partial side wall 415 may be provided. The partial side wall 415 may include one or more fastener holes 416, which may align with one or more fastener holes included on the removable side panel. Thus, to secure the removable side panel to the partial side wall 415, the removable side panel may be aligned with the partial side wall 415 and fasteners may be inserted through the fastener holes on the removable side panel and also through the fastener holes on the partial side wall 415. However, this is merely one example of a manner in which the removable side panel may be attached to the partial side wall 415 and is not intended to be limiting. As another non-limiting example, an adhesive may be applied to the partial side wall 415 and/or the removable side panel.

FIG. 4 also illustrates a partially-visible second opening 413, which may also be covered by a second removable side panel in a similar manner to which the first removable side panel is used to cover the opening 412. It should be noted that while the embodiment depicted in this figure includes two side panels and areas for receiving two removable side panels (two openings), this is merely only example embodiment and any other combination of side panels and removable side panels may also be provided on an EVSE pedestal as well. For example, all four sides of the EVSE pedestal may include permanent side panels, three sides may include permanent side panels and one side may include an opening that may be covered by a removable side panel, all of the sides may include openings that may be covered by removable side panels, etc. FIG. 4 also shows aperture 422, which may be the same as aperture 115 shown in FIG. 1A.

FIG. 4 also depicts four different anchor points provided on the first side panel 408 and the second side panel 410 (for example, anchor points 414). However, as aforementioned, any other number of anchor points may also be provided on the EVSE pedestal as well.

Figure 5B:
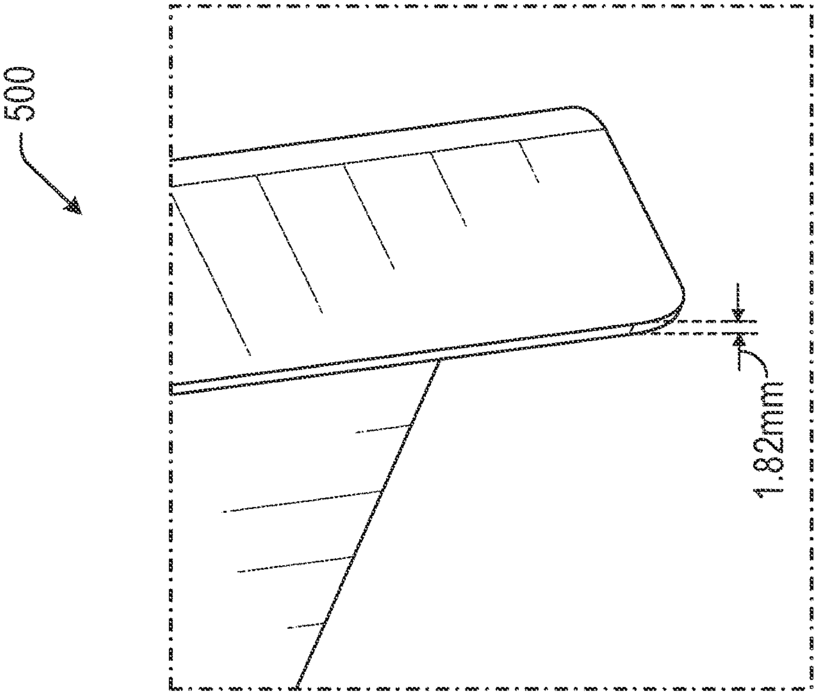
FIGS. 5A-5B illustrates example dimensions associated with an EVSE pedestal in accordance with one or more example embodiments of the disclosure.
Figure 5A:
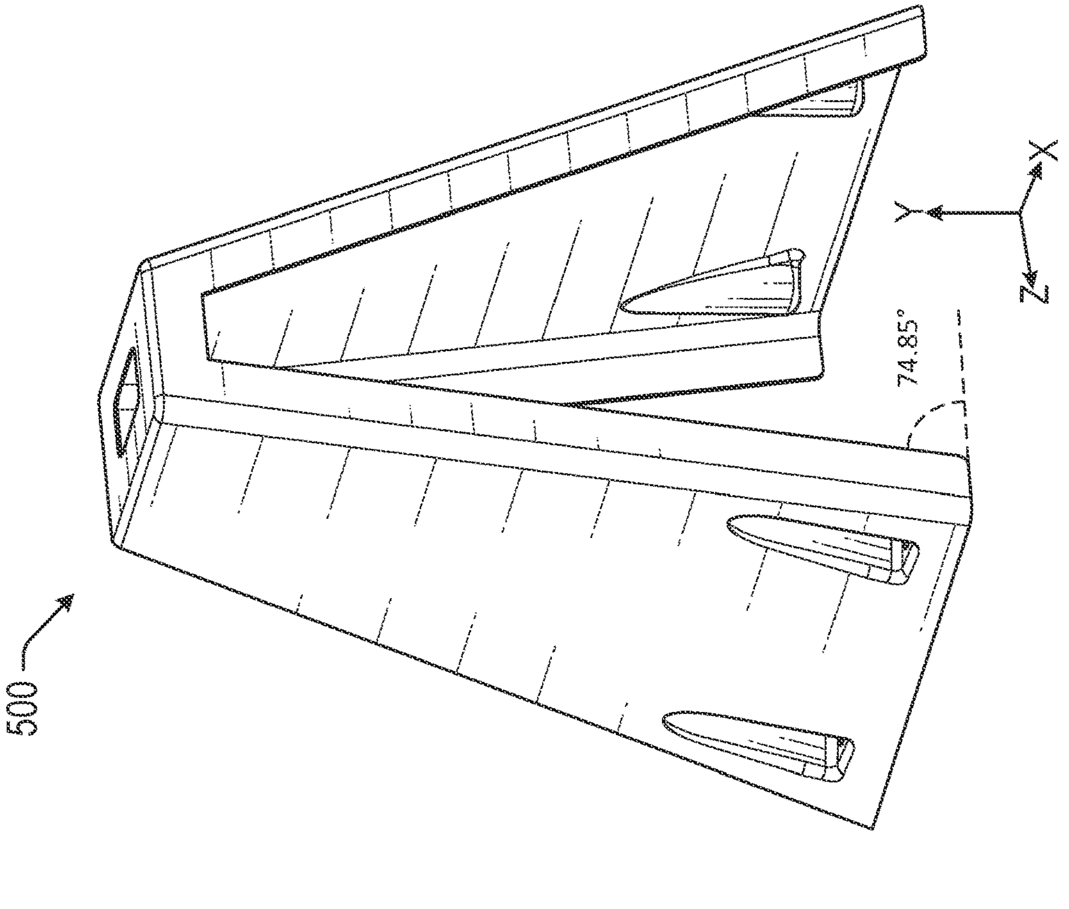

FIGS. 5A-5B illustrates example dimensions associated with an EVSE pedestal 500 in accordance with one or more example embodiments of the disclosure. Particularly, FIG. 5A illustrates that an angle at which the side panels are provided with respect to the surface of 74.85 degrees (however, any other angle may also be used as well). FIG. 5B illustrates that an example thickness of the material comprising the EVSE pedestal 500 may be approximately 1.82 mm. A base 105 of the EVSE pedestal 100 may comprise a 26 inch by 26 inch area. However, this merely illustrates that the EVSE pedestal is configured to provide sufficient structural rigidity to withstand environmental conditions, while also not requiring a substantial amount of materials to be used to manufacture the EVSE pedestal (and also advantageously that the EVSE pedestal may be provided in a lighter, smaller form factor). This thickness (and/or any other dimensions) is not intended to be limiting and the material may also comprise any other thickness as well.

FIG. 6 is an illustration of a shroud 600 for an EVSE pedestals in accordance with one or more example embodiments of the disclosure. The shroud 600 may comprise one or more members (for example, first member 602, second member 604, and/or any other number of members) that may be used to removably affix the shroud 600 to the EVSE pedestal (not shown in the figure). The first member 602 and second member 604 may be similar to the mounting member 117 shown in FIG. 1A. For example, as aforementioned, the shroud may include one or more first fastener holes 606 that may align with various fastener holes located on the EVSE pedestal. Thus, when the shroud 600 is positioned over the EVSE pedestal, the one or more first fastener holes 606 of the shroud 600 may be aligned with the one or more fastener holes of the EVSE Pedestal. When alignment occurs, one or more fasteners may be inserted through the one or more first fastener holes 606 of the shroud 600 and the one or more holes of the EVSE Pedestal to secure the shroud 600 to the EVSE pedestal. However, the shroud 600 may also be secured to the EVSE pedestal in any other suitable manner as well.

FIG. 6 also further illustrates the partial sidewalls included on the shroud 600 to which one or more EVSEs may be mounted. For example, the shroud 600 is depicted as including a first partial side wall 608 and a second partial side wall 610. To mount the EVSE to the shroud 600, a surface of the EVSE (for example, the back surface and/or any other surface) may be positioned on either the first partial side wall 608 or the second partial side wall 610 and the EVSE may then be fastened to the shroud 600. For example, as aforementioned, the shroud 600 may be provided with one or more fastener holes 612 that are compatible with fastener holes that are standard on a particular type of EVSE. Thus, when the EVSE is aligned with the shroud 600, the one or more fastener holes 612 on the shroud 600 should align with the fastener holes on the EVSE. Thus, the EVSE may be secured to the shroud 600 by providing fasteners through the one or more fastener holes 612 on the shroud 600 and the corresponding fastener holes on the EVSE. The EVSE may then similarly be removed from the shroud by removing the fasteners from the EVSE and shroud 600.

As aforementioned, the shroud 600 may also be configured to be universally applicable to different types of EVSEs. For example, while a first type of EVSE may have a first set of apertures positions at a first set of locations on the EVSE, a second type of EVSE may have a second set of fastener holes positioned at different locations on the EVSE. Additionally, different EVSEs may simply have different form factors, which may naturally lend itself to differing fastener locations. Thus, the shroud 600 may be configured with multiple sets of fastener holes, with each different set being compatible with a different type of EVSE.

Figure 7:
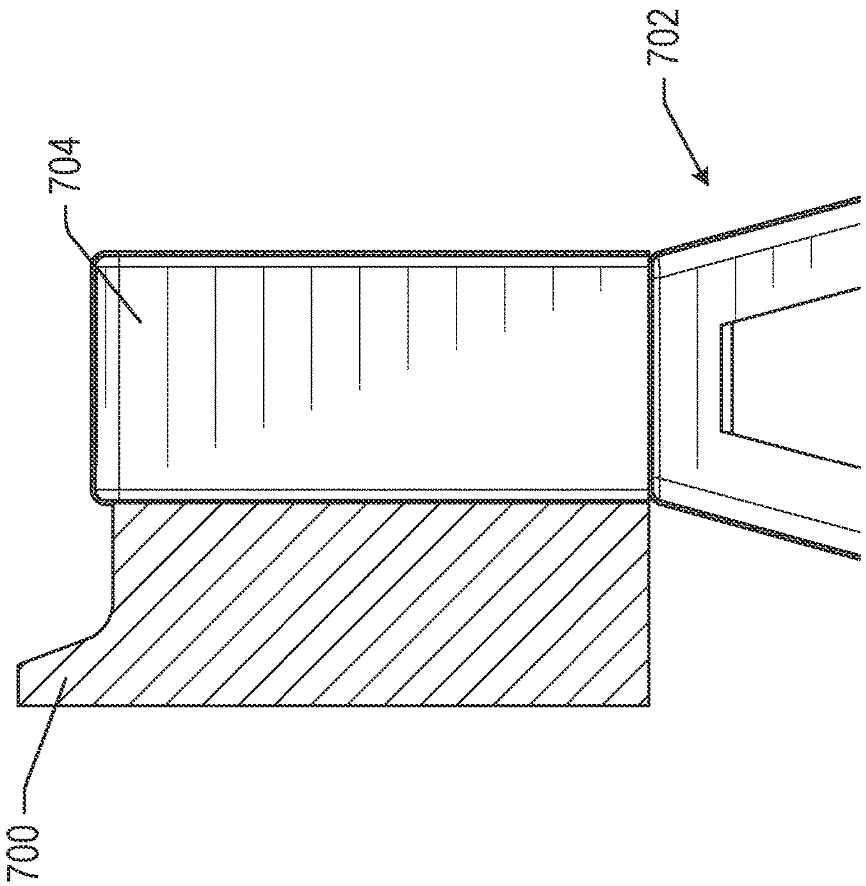
FIG. 7 is an illustration of an EVSE mounted to a shroud in accordance with one or more example embodiments of the disclosure.

FIG. 7 is an illustration of an EVSE 700 mounted to a shroud 704 in accordance with one or more example embodiments of the disclosure. Particularly, FIG. 7 shows a side-view of the EVSE 700, the shroud 704, and the EVSE pedestal 702. The figure illustrates that a back surface of the EVSE 700 may be mounted to a partial side wall of the shroud 704 (these surfaces are not fully visible in this side-view). FIG. 7 also illustrates that the shroud 704 may be configured to receive a second EVSE on the second partial side wall in a similar manner to which the EVSE is mounted to the first partial side wall. The shroud 704 may also be configured to receive any other number of EVSEs as well.

FIG. 8 is an illustration of close-up view of an anchor point 800 on an EVSE pedestal 802 in accordance with one or more example embodiments of the disclosure.

The anchor point 800 corresponds to the anchor point shown in FIG. 1A. In one or more embodiments, the anchor point 800 may include a cavity 802. The cavity 802 may include at least a side wall 804 and a bottom surface 806 including a fastener hole 808. The fastener hole 808 may be aligned by a user with a hole 810 located in the surface on which the EVSE pedestal rests. For example, a hole may be drilled into concrete in a parking lot or a residential garage such that the EVSE pedestal may be secured to the surface. It should be noted that the fastener hole 808 and the hole 810 are not completely visible in the figure given that the threaded anchor 812 is shown as being inserted into the fastener hole 808 and the hole 810.

In one or more embodiments (and as illustrated in at least FIG. 1A), the side wall 804 of the cavity 802 may be a concave shape (however, any other shape may be applicable). This concave shape may be used to allow for access to any hardware that is used within the anchor point 800 (for example, threaded anchors, washers, nuts, etc.). That is, the cavity 802 may be shaped such that a user may be able to align tools (such as a power drill, wrench, etc.) with the hardware included within the anchor point 800.

In one or more embodiments, to secure the EVSE pedestal to the surface using the anchor point 800, a threaded anchor 812 may be provided (for example, threaded) through the fastener hole 808 and the hole 810 provided in the surface. One or more washers 816 and nuts 818 may then be threaded over the threaded anchor 812 to secure the EVSE pedestal to the surface by providing a force on the bottom surface 806 through the one or more washers 816 and nuts 818. Thus, the EVSE pedestal may be prevented from changing position (without removing the one or more washers 816 and nuts 818 from the threated anchor 812) by the one or more washers 816 and nuts 818.

The anchor point 800 may include a piece of supporting hardware 814, such as a steel bushing, located underneath the bottom surface 806 and the one or more washers 816 and nuts 818 to provide additional structure to the anchor point 800. It should be noted that FIG. 8 only presents one example manner by which the EVSE pedestal 800 may be secured to the surface, and any other mechanisms may also be applicable as well. Additionally, although a threaded anchor 812, one or more washers 816, one or more nuts 818, and support hardware 814 are shown as being used to secure the EVSE pedestal to the surface at the anchor point 800, any other similar types of hardware may also be used.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electric vehicle supply equipment (EVSE) pedestal system comprising:

an electric vehicle supply equipment (EVSE) pedestal comprising a top surface, a first side panel, a second side panel, and a third side panel, wherein the first side panel and second side panel are permanently affixed to the EVSE pedestal, wherein the third side panel is configured to be removably affixed to the EVSE pedestal, and wherein the first side panel, second panel, and third side panel are configured at an angle with respect to the top surface such that a first area of a base of the EVSE pedestal is greater than a second area of the top surface of the EVSE pedestal; and a shroud configured to be removably affixed to the EVSE pedestal, wherein the shroud comprises one or more apertures configured to receive one or more fasteners used removably affix the EVSE to the shroud, wherein the one or more apertures comprise a first set of apertures associated with a first type of EVSE and a second set of apertures associated with a second type of EVSE.

2. The electric vehicle supply equipment (EVSE) pedestal system 1, wherein at least one of the first side panel, the second side panel, and the third side panel further comprise one or more apertures configured to receive an electrical cable from the EVSE.

3. The electric vehicle supply equipment (EVSE) pedestal system 1, wherein the angle is between 70 and 80 degrees.

4. The electric vehicle supply equipment (EVSE) pedestal system 1, wherein a thickness of the first side panel, the second side panel, and the third side panel is less than 3 mm.

5. An electric vehicle supply equipment (EVSE) pedestal system comprising:

an electric vehicle supply equipment (EVSE) pedestal comprising one or more side panels, wherein the one or more side panels are provided at an angle; and a shroud configured to be removably affixed to a top surface of the EVSE pedestal, wherein the shroud comprises a first partial side wall and a second partial side wall, wherein the first partial side wall and the second partial side wall are on opposing sides of the shroud, wherein each of the first partial side wall and the second partial side wall surrounds an opening defined by the shroud, wherein the shroud is configured to receive an EVSE that is removably affixed to the first partial side wall of the shroud.

6. The system of claim 5, wherein the one or more side panels comprise a first side panel and a second side panel.

7. The system of claim 6, wherein the one or more side panels further comprise a third side panel that is configured to be removably affixed to the EVSE pedestal.

8. The system of claim 5, wherein the EVSE pedestal further comprise one or more anchor mechanisms configured to secure the EVSE pedestal to a surface.

9. The system of claim 8, wherein the one or more anchor mechanisms comprise one or more fastener holes configured to receive a fastener to secure the EVSE pedestal to the surface.

10. The system of claim 5, wherein the shroud comprises one or more apertures configured to receive one or more fasteners used to removably affix the EVSE to the shroud, wherein the one or more apertures comprise a first set of apertures associated with a first type of EVSE and a second set of apertures associated with a second type of EVSE.

11. The system of claim 10, wherein the EVSE pedestal is a first EVSE pedestal and is configured to be stacked with a second EVSE pedestal.

12. The system of claim 5, wherein at least one of the one or more side panels further comprise one or more apertures configured to receive an electrical cable from the EVSE.

13. The system of claim 5, wherein a thickness of the one or more side panels is less than 3 mm.

14. An electric vehicle supply equipment (EVSE) pedestal comprising:

a top surface and one or more side panels, wherein the one or more side panels are provided at an angle such that a first area of a base of the EVSE pedestal is greater than a second area of the top surface of the EVSE pedestal, wherein the EVSE pedestal is configured to receive a shroud configured to be removably affixed to the EVSE pedestal, wherein the shroud is configured to receive an EVSE that is removably affixed to the shroud.

15. The electric vehicle supply equipment (EVSE) pedestal of claim 14, wherein the one or more side panels comprise a first side panel and a second side panel, and wherein the one or more side panels further comprise a third side panel that is configured to be removably affixed to the EVSE pedestal.

16. The electric vehicle supply equipment (EVSE) pedestal of claim 14, further comprising one or more anchor mechanisms configured to secure the EVSE pedestal to a surface.

17. The electric vehicle supply equipment (EVSE) pedestal of claim 16, wherein the one or more anchor mechanisms comprise an aperture configured to receive a fastener to secure the EVSE pedestal to a surface.

18. The electric vehicle supply equipment (EVSE) pedestal of claim 14, wherein the one or more side panels further comprise one or more fastener holes configured to receive an electrical cable from the EVSE.

19. The electric vehicle supply equipment (EVSE) pedestal of claim 14, wherein the top surface includes an aperture.

20. The electric vehicle supply equipment (EVSE) pedestal of claim 14, wherein a thickness of the one or more side panels is less than 3 mm.

21. The system of claim 5, wherein the shroud comprises a mounting member configured to be affixed to an external surface of a side panel of the EVSE pedestal.

* * * * *